(12) United States Patent
Sasaki

(10) Patent No.: US 11,149,671 B2
(45) Date of Patent: Oct. 19, 2021

(54) VEHICLE SYSTEM

(71) Applicant: TOYOTA JIDOSHA KABUSHIKI KAISHA, Aichi-ken (JP)

(72) Inventor: Keisuke Sasaki, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 221 days.

(21) Appl. No.: 16/372,327

(22) Filed: Apr. 1, 2019

(65) Prior Publication Data

US 2019/0368438 A1 Dec. 5, 2019

(30) Foreign Application Priority Data

May 30, 2018 (JP) .............................. JP2018-103810

(51) Int. Cl.
| | |
|---|---|
| *F02D 41/06* | (2006.01) |
| *F02D 41/00* | (2006.01) |
| *F02D 41/34* | (2006.01) |
| *B60K 6/24* | (2007.10) |
| *B60W 20/00* | (2016.01) |

(52) U.S. Cl.
CPC .............. *F02D 41/062* (2013.01); *B60K 6/24* (2013.01); *B60W 20/00* (2013.01); *F02D 41/0002* (2013.01); *F02D 41/34* (2013.01); *B60W 2710/0622* (2013.01); *B60W 2710/0672* (2013.01); *B60W 2710/085* (2013.01); *B60Y 2200/92* (2013.01); *B60Y 2300/192* (2013.01); *F02D 2200/1002* (2013.01)

(58) Field of Classification Search
CPC .......... F02D 41/00; F02D 41/04; F02D 41/06; F02D 41/062; F02D 41/064; F02D 41/065; F02D 41/068; F02D 41/083; F02D 41/086; F02D 41/10; F02D 41/1402; B60W 2710/0622; B60W 2710/0672

See application file for complete search history.

(56) References Cited

U.S. PATENT DOCUMENTS

| | | | |
|---|---|---|---|
| 2011/0088659 A1* | 4/2011 | Wang | .............. F02D 41/0087 123/350 |
| 2011/0197860 A1 | 8/2011 | Aso et al. | |

FOREIGN PATENT DOCUMENTS

| | | | |
|---|---|---|---|
| JP | 2003-97318 A | | 4/2003 |
| JP | 2005233001 A | * | 9/2005 |
| JP | 2007146826 A | | 6/2007 |

(Continued)

*Primary Examiner* — Aniss Chad
*Assistant Examiner* — Elijah W. Vaughan
(74) *Attorney, Agent, or Firm* — Hauptman Ham, LLP

(57) ABSTRACT

A vehicle system includes an internal combustion engine including a fuel injection valve configured to inject fuel into an intake port and a throttle valve configured to control intake air amount for controlling engine torque, and being mounted on a vehicle. The vehicle system further includes a control device configured to control the vehicle. The control device includes a fuel increment controlling component that executes a fuel increment control to make the air-fuel ratio richer than the stoichiometric air-fuel ratio in a plurality of cycles started from a fuel injection start cycle at the time of engine start-up. Where a torque rate correlation value correlated with a torque rate that is a time rate of increase of the engine torque is lower, the fuel increment controlling component decreases a total fuel injection amount in the plurality of cycles.

14 Claims, 8 Drawing Sheets

(56) References Cited

FOREIGN PATENT DOCUMENTS

| | | | | |
|---|---|---|---|---|
| JP | 3982159 | B2 | * | 9/2007 |
| JP | 2011163267 | A | | 8/2011 |
| JP | 2016148303 | A | | 8/2016 |
| JP | 2017137772 | A | * | 8/2017 |

* cited by examiner

VEHICLE SYSTEM

CROSS-REFERENCE TO RELATED APPLICATION

This application is based on and claims the benefit of Japanese Patent Application No. 2018-103810, filed on May 30, 2018, which is incorporated by reference herein in its entirety.

BACKGROUND

Technical Field

The present disclosure relates to a vehicle system, and more particularly to a vehicle system configured to control a vehicle on which an internal combustion engine is mounted.

Background Art

For example, JP 2003-097318 A discloses a fuel injection control device for an internal combustion engine configured to perform a fuel increment control to increase the fuel injection amount at the time of engine start-up.

SUMMARY

An internal combustion engine mounted on a vehicle may be required to generate a desired engine torque immediately after an engine start-up. In an internal combustion engine in which an intake air amount is controlled using a throttle valve to control the engine torque, when a time rate of change of the engine torque (hereunder, referred to as a "torque rate") is low at the time of engine start-up, a time rate of change of throttle opening degree becomes low (i.e., a time rate of change of intake air amount becomes low).

Because of the above, during a time in which the engine torque is increasing, when the torque rate is lower, intake air negative pressure downstream of the throttle valve becomes higher, and a time period in which the intake air negative pressure becomes higher becomes longer. When the intake air negative pressure becomes higher, the atomization of fuel attached on intake ports is facilitated. The atomized fuel flows into cylinders along with the intake air. Thus, there is a concern that, when the torque rate is lower, the degree of enrichment of an air-fuel ratio may become greater and, as a result, the exhaust gas emission performance may be decreased.

The present disclosure has been made to address the problem described above, and an object of the present disclosure is to provide a vehicle system that can reduce the enrichment of the air-fuel ratio due to the fact that a time rate of increase of engine torque (i.e., torque rate) is low at the time of engine start-up.

A vehicle system according to the present disclosure includes: an internal combustion engine including a fuel injection valve configured to inject fuel into an intake port and a throttle valve configured to control intake air amount for controlling engine torque, and being mounted on a vehicle; and a control device configured to control the vehicle. The control device includes a fuel increment controlling component that executes a fuel increment control to make an air-fuel ratio richer than a stoichiometric air-fuel ratio in a plurality of cycles started from a fuel injection start cycle at a time of engine start-up. Where a torque rate correlation value correlated with a torque rate that is a time rate of increase of the engine torque is lower, the fuel increment controlling component decreases a total fuel injection amount in the plurality of cycles.

The vehicle system may be a hybrid vehicle system including an electric motor configured to drive the vehicle. The control device may also include a torque rate controlling component that executes a torque rate control that makes the torque rate variable at the time of engine start-up. The torque rate correlation value may also correspond to the torque rate that is set by the torque rate controlling component.

Where the torque rate correlation value is lower, the fuel increment controlling component may decrease a fuel injection amount per one cycle in at least one of the plurality cycles.

A processing executed by the fuel increment controlling component to decrease the fuel injection amount per one cycle in at least one of the plurality of cycles may include a lean correction that makes the air-fuel ratio leaner than the stoichiometric air-fuel ratio.

Where controlling the fuel injection amount per one cycle, within a range in which the air-fuel ratio is made richer than the stoichiometric air-fuel ratio, to decrease the total fuel injection amount, the fuel increment controlling component may cause the number of the plurality of cycles to be smaller when the torque rate correlation value is lower.

Where controlling the fuel injection amount per one cycle, within a range in which the air-fuel ratio is made leaner than the stoichiometric air-fuel ratio, to decrease the total fuel injection amount, the fuel increment controlling component may cause the number of the plurality of cycles to be greater when the torque rate correlation value is lower.

According to the vehicle system of the present disclosure, where the torque rate correlation value correlated with the torque rate that is the time rate of increase of the engine torque is lower, the fuel increment controlling component decreases a total fuel injection amount in a plurality of cycles started from a fuel injection start cycle at the time of engine start-up. As a result, the enrichment of the air-fuel ratio due to the fact that the fuel increment is executed under low torque rate correlation values at the time of engine start-up can be reduced.

DETAILED DESCRIPTION

In the following, embodiments of the present disclosure will be described. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

A first embodiment according to the present disclosure and modification examples thereof will be described with reference to FIGS. 1 to 9.

1-1. Example of Configuration of Vehicle System

Figure 1:
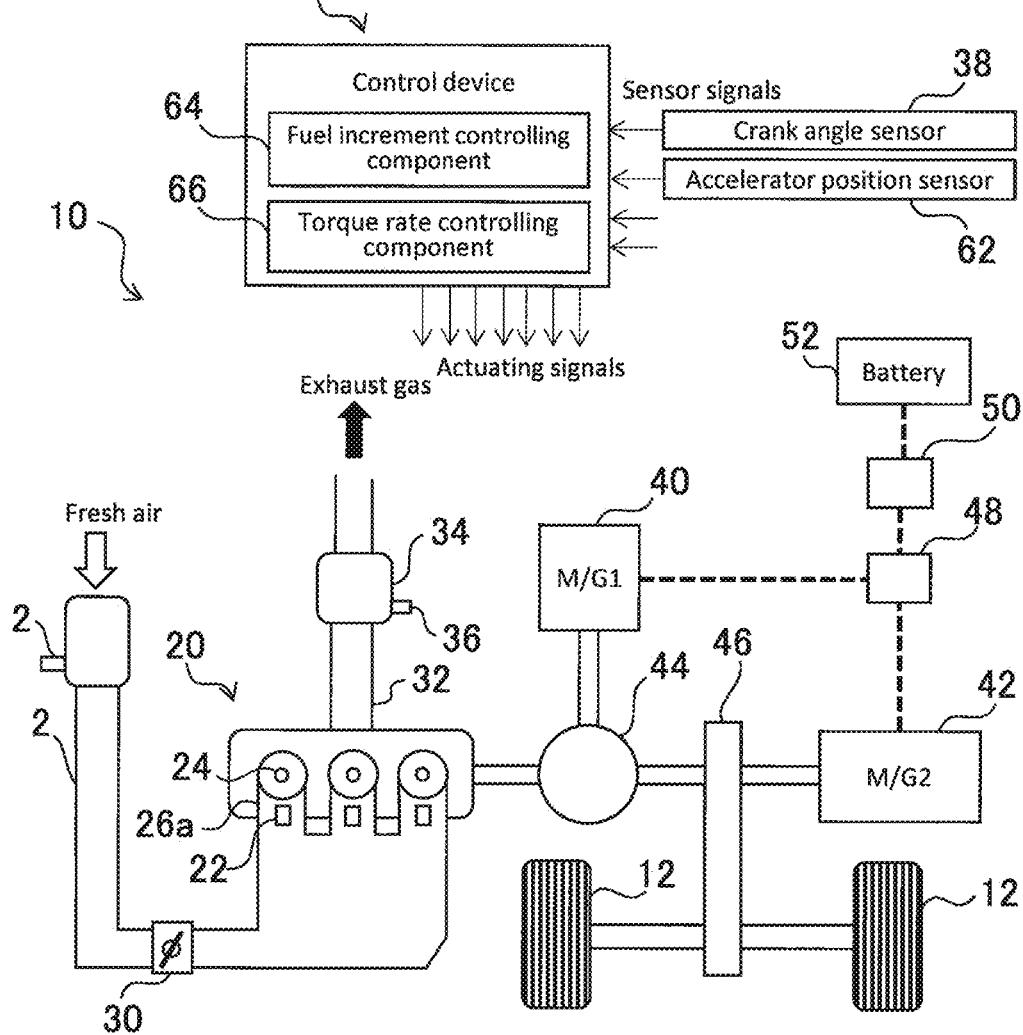
FIG. 1 is a diagram for schematically describing an example of the configuration of a vehicle system according to a first embodiment of the present disclosure.

FIG. 1 is a diagram for schematically describing an example of the configuration of a vehicle system 10 according to the first embodiment of the present disclosure. The vehicle system 10 shown in FIG. 1 is a system of a power-split hybrid vehicle provided with a plurality of power devices.

The vehicle system 10 is provided with an internal combustion engine 20 as one of power devices for rotationally driving vehicle wheels 12. As an example, the internal combustion engine 20 is a spark ignition in-line three-cylinder engine. The internal combustion engine 20 is equipped with fuel injection valves 22 and an ignition device 24 (only ignition plugs are illustrated). Each of the fuel injection valves 22 is arranged for the corresponding cylinder, and is a port injection valve configured to inject fuel into the corresponding intake port 26a of an intake air passage 26. The ignition device 24 is configured to ignite an air-fuel mixture in each cylinder by the use of the spark plug arranged for each cylinder. It should be noted that the internal combustion engine 20 may be additionally equipped with in-cylinder injection valves configured to inject fuel directly into the respective cylinders.

In the vicinity of an inlet of the intake air passage 26, an air flow sensor 28 that outputs a signal responsive to the flow rate of air taken into the intake air passage 26 is arranged. An electronically-controlled throttle valve 30 is arranged in a portion of the intake air passage 26 located on the downstream side of the air flow sensor 28. Moreover, an exhaust gas purifying catalyst 34 for purifying exhaust gas is arranged in an exhaust gas passage 32 of the internal combustion engine 20. A catalyst temperature sensor 36 that outputs a signal responsive to catalyst temperature is attached to the exhaust gas purifying catalyst 34. Furthermore, the internal combustion engine 20 is equipped with a crank angle sensor 38. The crank angle sensor 38 outputs a signal responsive to crank angle.

As others of the power devices described above, the vehicle system 10 is provided with a first motor generator (M/G1) 40 and a second motor generator (M/G2) 42 that are both electric motors that can generate electric power. The first motor generator 40 and the second motor generator 42 are alternate current synchronous motor generators having both a function as an electric motor that outputs a torque using a supplied electric power and a function as an electric generator that transduces an inputted mechanical power into the electric power. The first motor generator 40 is mainly used as the electric generator, and the second motor generator 42 is mainly used as the electric motor.

The internal combustion engine 20, the first motor generator 40 and the second motor generator 42 are coupled to the vehicle wheels 12 via a power split device 44 and a speed reducer 46. The power split device 44 is, for example, a planetary gear unit and splits the torque (engine torque Te) outputted from the internal combustion engine 20 into torques of the first motor generator 40 and the vehicle wheels 12. The torque outputted from the internal combustion engine 20 or the torque outputted from the second motor generator 42 is transmitted to the vehicle wheels 12 via the speed reducer 46. The first motor generator 40 regenerates electric power using a torque supplied from the internal combustion engine 20 via the power split device 44. Moreover, cranking for the start-up of the internal combustion engine 20 can be performed by the use of the first motor generator 40 that functions as an electric motor.

The first motor generator 40 and the second motor generator 42 each perform the supply and receipt of the electric power with a battery 52 via an inverter 48 and a converter 50. The inverter 48 converts the electric power stored in the battery 52 from direct current (DC) to alternating current (AC) to supply the second motor generator 42 with this AC, and converts the electric power generated by the first motor generator 40 from AC to DC to store the battery 52. As a result, the battery 52 is charged with the electric power generated by the first motor generator 40 or the second motor generator 42, and the electric power stored in the battery 52 is discharged when it is consumed by the first motor generator 40 or the second motor generator 42.

The vehicle system 10 according to the present embodiment is provided with a control device 60 for controlling a vehicle (power train) that includes the internal combustion engine 20, the first motor generator 40 and the second motor generator 42. The control device 60 is an electronic control unit (ECU) that includes at least one processor, at least one memory, and an input/output interface.

The input/output interface receives sensor signals from various sensors attached to the internal combustion engine 20 and the hybrid vehicle on which the internal combustion engine 20 is mounted, and also outputs actuating signals to various actuators for controlling the operation of the internal combustion engine 20 and the hybrid vehicle. The various sensors described above include an accelerator position sensor 62 in addition to the air flow sensor 28, the catalyst temperature sensor 36 and the crank angle sensor 38 that are described above. The accelerator position sensor 62 outputs a signal responsive to depression amount (i.e., accelerator position) of an accelerator pedal of the hybrid vehicle. The control device 60 can calculate an engine speed NE by the use of the signal of the crank angle sensor 38.

Furthermore, the various actuators described above include the fuel injection valves 22, the ignition device 24, the throttle valve 30, the first motor generator 40 and the second motor generator 42. In the memory of the control device 60, various programs and various data (including maps) for controlling the hybrid vehicle are stored. The processor executes the programs stored in the memory. As a result, various functions of the control device 60 (such as, various engine controls and motor generator control) are achieved. In more detail, the control device 60 is configured including, as function blocks, a fuel increment controlling component 64 and a torque rate controlling component 66 described below. It should be noted that the control device 60 may alternatively be configured with a plurality of ECUs.

1-2. Control of Vehicle System 1-2-1. Basic Operation of Fuel Increment Control at Time of Engine Start-Up The fuel increment controlling component 64 executes a "fuel increment control" to make the air-fuel ratio richer than the stoichiometric air-fuel ratio in a plurality of cycles (for example, cyc1 to cyc10 in FIG. 2) started from a fuel injection start cycle (cyc1 described below) at the time of engine start-up.

Figure 2:
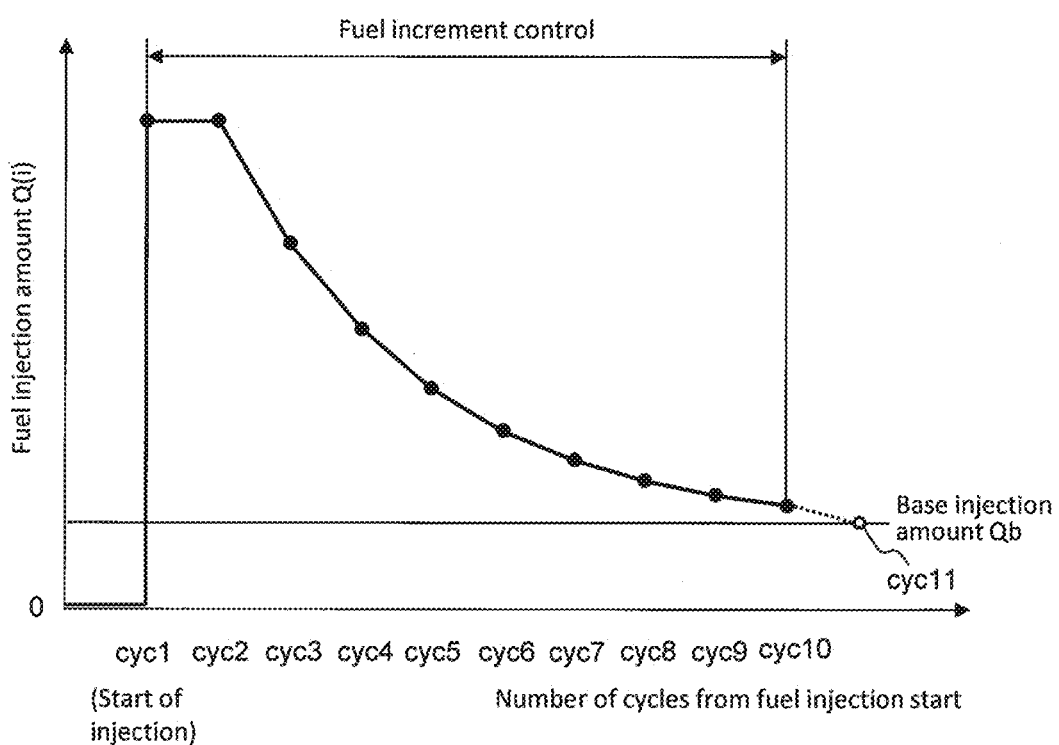
FIG. 2 is a graph for describing a basic operation of a fuel increment control at the time of engine start-up.

FIG. 2 is a graph for describing the basic operation of the fuel increment control at the time of engine start-up. The vertical axis of FIG. 2 shows fuel injection amount Q(i) and the horizontal axis shows the number of cycles from the start of fuel injection. It should be noted that FIG. 2 indicates changes in the fuel injection amount Q(i) for the same cylinder. In addition, the engine start-up of the hybrid vehicle is repeatedly executed each time when the generation of engine torque Te is required after the internal combustion engine 20 is intermittently stopped during operation of the vehicle system 10.

The fuel injection by the fuel injection valve 22 is started along with the ignition by the ignition device 24 when the engine speed NE is increased to a designated threshold value after the start of the cranking. According to the example shown in FIG. 2, the fuel increment control is executed for ten cycles from the fuel injection start cycle (the first cycle cyc1) to the tenth cycle cyc10. A "base injection amount Qb" in FIG. 2 refers to a fuel amount required to achieve the stoichiometric air-fuel ratio under the current intake air amount (i.e., in-cylinder charge air amount). Although the intake air amount may change between cycles, the base injection amount Qb is constant in the example shown in FIG. 2 for ease of explanation. The fuel increment control increases the fuel injection amount Q with respect to the base injection amount Qb at the time of engine start-up in order to achieve good startability by taking into consideration various effects, such as fuel property.

To be more specific, as a result of the fuel injection and ignition at the first cycle cyc1, combustion is started (i.e., the initial explosion is performed). According to the example shown in FIG. 2, the fuel injection amount Q(2) for the second cycle cyc2 is the same as the fuel injection amount Q(1) for the first cycle cyc1. In the third cycle cyc3 to the tenth cycle cyc10 thereafter, the fuel injection amounts Q(4) to Q(10) are gradually decreased for each cycle so as to approach the base injection amount Qb. It should be noted that, since the fuel increment control is not directed to the eleventh cycle cyc11 thereafter, correction by the present fuel increment control is not performed at this eleventh cycle cyc11. Because of this, according to the example shown in FIG. 2, the fuel injection amount for the eleventh cycle cyc11 is equal to the base injection amount Qb. A white cycle in FIG. 2 indicates the initial cycle after the fuel increment control ends (in the example shown in FIG. 2, cyc11). This also applies to FIGS. 5, 8, 11 and 12 described below.

Additionally, the fuel increment control described above will be supplementally described as follows. First, a plurality of cycles for the fuel increment control are not limited to the example of ten cycles described above, and may alternatively be any other desired plurality of cycles. In addition, according to the example shown in FIG. 2, although the fuel injection amounts for cycles cyc1 and cyc2 are the same as each other, the fuel injection amounts during the fuel increment control may alternatively start to be decreased from the second cycle cyc2. Contrary to this, cycles with the same fuel injection amount at the initial stage of the fuel increment control may be three or more desired cycles. Furthermore, an increment correction value with respect to the base injection amount Qb may alternatively be gradually decreased for each one injection in all injections for all the cylinders of the internal combustion engine 20 that are performed in series in accordance with a designated ignition order.

1-2-2. Torque Rate Control

The control of the axial torque (engine torque Te) of the internal combustion engine 20 is performed basically by controlling the intake air amount using the throttle valve 30 such that a target intake air amount depending on a required engine torque is achieved. The control of the vehicle system 10 by the control device 60 includes a torque rate control performed by the torque rate controlling component 66. The torque rate mentioned here refers to a time rate of increase of the engine torque Te (dTe/dt [Nm/sec]).

Figure 3:
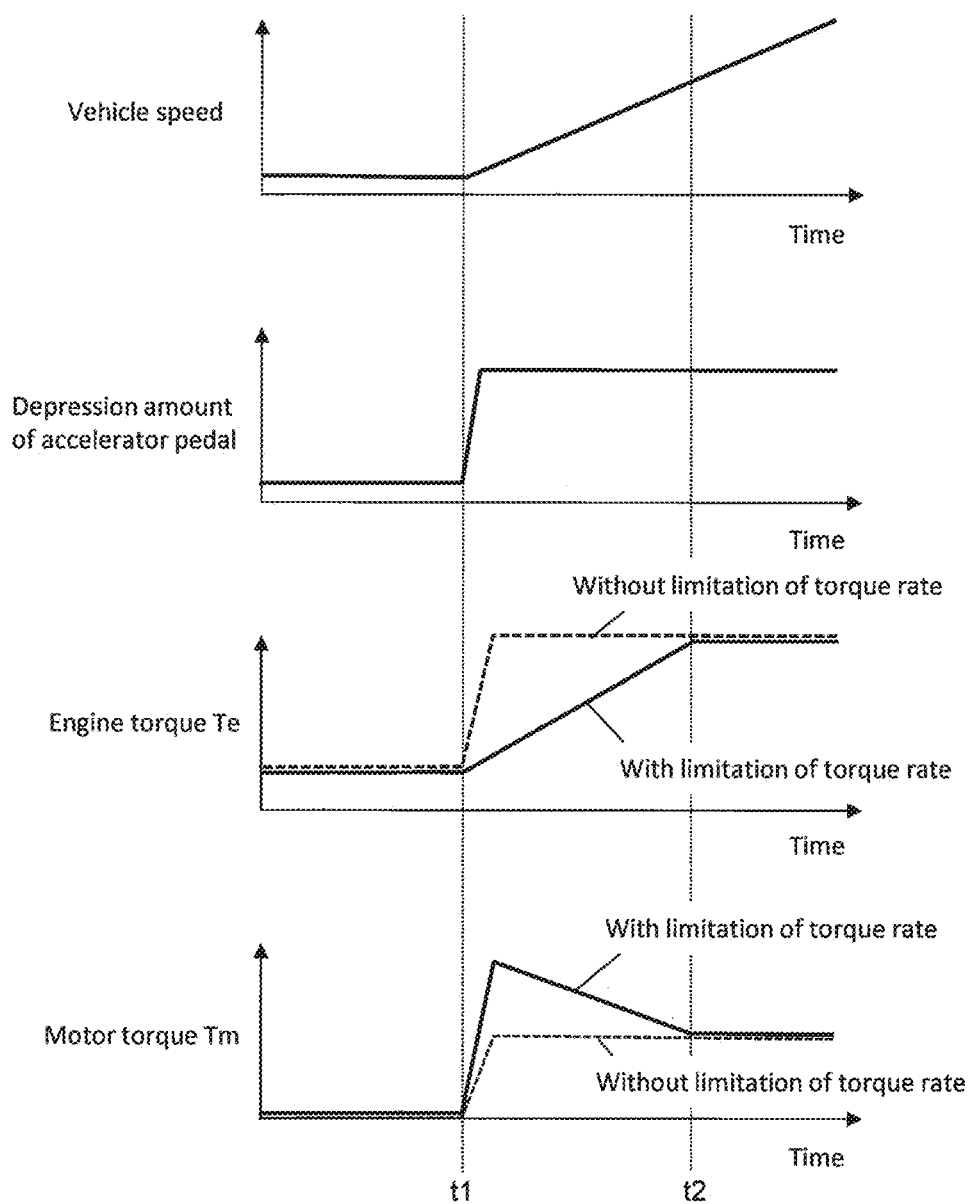
FIG. 3 is a time chart for describing the basic operation of a torque rate control.

Specifically, the torque rate control is performed to limit the torque rate to a low level as needed in order to achieve a "designated purpose". FIG. 3 is a time chart for describing the basic operation of the torque rate control. It should be noted that, from top to bottom in FIG. 3, a chart at the first stage indicates a time rate of change of vehicle speed, a chart at the second stage indicates a time rate of change of the accelerator position (i.e., the depression amount of the accelerator pedal), a chart at the third stage indicates a time rate of change of the engine torque Te, and a chart at the fourth stage indicates a time rate of change of motor torque Tm. The motor torque Tm refers to a torque outputted from the second motor generator 42.

FIG. 3 indicates an example in which, during vehicle running using only the motor torque Tm as the vehicle driving torque, a rapid acceleration is requested at a time point t1 as a result of the accelerator pedal being depressed by the driver. If the depression amount of the accelerator pedal is increased, both of the engine torque Te and the motor torque Tm are increased in order to achieve a required vehicle driving torque associated with the depression amount of the accelerator pedal. Waveforms of the engine torque Te and the motor torque Tm shown by broken lines in FIG. 3 are associated with an example in which there is no limit of the torque rate by the torque rate control.

On the other hand, waveforms of the engine torque Te and the motor torque Tm shown by solid lines in FIG. 3 are associated with an example in which there is a limit of the torque rate. In this example, as shown in FIG. 3, the engine torque Te moderately increases as compared to the example of the broken lines. In this way, if the torque rate is lowered, the engine torque Te becomes lower in a time period (t1-t2) required for the engine torque Te to be reached to the required torque after the start of the acceleration. Thus, the torque rate control according to the present embodiment includes a motor torque control for making up for a shortage of the engine torque Te with the motor torque Tm in this way. That is to say, according to the example shown in FIG. 3, the motor torque Tm is controlled such that, during transient operation from the time point t1 to the time point t2 in which the engine torque Te is changing, the total value of the engine torque Te and the motor torque Tm meets the required vehicle driving torque. As a result, the motor torque Tm during the transient operation is made higher as compared to the example shown by the broken lines.

Both achievement of reduction of decrease of exhaust gas emission performance and improvement of the responsiveness of the engine torque Te corresponds to an example of the "designated purpose" described above. In detail, when the torque rate control is high, the time rate of change of the intake air amount also becomes higher. As a result, fluctuation of the air-fuel ratio may become easy to occur, and the exhaust gas flow rate may increase. In addition, the purification performance of the exhaust gas purifying catalyst 34 becomes lower when the catalyst temperature is lower. Because of this, if the engine torque Te increases with a high torque rate under a high catalyst temperature condition, the exhaust gas emission performance decreases due to the fluctuation of the air-fuel ratio and an increase of the exhaust gas flow rate. On the other hand, from the viewpoint of increasing the responsiveness of the engine torque Te, it is favorable to increase the torque rate as much as possible, as long as a decrease of the exhaust gas emission performance can be reduced.

Accordingly, in the torque rate control according to the present embodiment, the torque rate is set to a value depending on the catalyst temperature. In detail, for example, the torque rate is set so as to be higher when the catalyst temperature is higher. According to this kind of setting, it becomes possible to increase the torque rate when the purification performance of the exhaust gas purifying catalyst 34 becomes higher. As a result, the reduction of decrease of the exhaust gas emission performance and the improvement of the responsiveness of the engine torque Te can be both achieved. In addition, according to the torque rate control of the present embodiment, as described above, a shortage of the torque with respect to the required vehicle driving torque can be made up for with an increase of the motor torque Tm. As a result, even when the purification performance of the exhaust gas purifying catalyst 34 is low, the torque outputted by the vehicle can be caused to approach the required vehicle driving torque while reducing a decrease of the exhaust gas emission performance.

It is noted that, instead of the catalyst temperature, the torque rate may be, for example, set so as to be different depending on the temperature of the battery 52. In detail, the responsiveness of the motor torque Tm is known to be generally better than that of the engine torque Te. Because of this, from the viewpoint of the acceleration performance of the vehicle, it is favorable to limit the engine torque Te to increase the degree of use of the motor torque Tm. However, on the other hand, the output performance of the battery 52 is known to decrease under low-temperature conditions, such as zero degrees C. or lower. Because of this, there is a concern that, if the degree of use of the motor torque Tm is increased under this kind of low-temperature conditions, the required vehicle driving torque cannot be achieved with a high responsiveness. Accordingly, for example, the torque rate may alternatively be set so as to be higher when the temperature of the battery 52 is lower. According to this kind of setting, the responsiveness of the engine torque Te can be increased under conditions that the output performance of the battery 52 is low. Therefore, a decrease of the responsiveness of the torque of the vehicle can be reduced also in this condition. In addition, enabling a decrease of the acceleration responsiveness of the vehicle to be reduced also under the low-temperature conditions corresponds to an example of the "designated purpose".

1-2-3. Issue on Execution of Torque Rate Control at Time of Engine Start-Up

In a hybrid vehicle, as exemplified in FIG. 3, an engine start-up may be performed in response to a vehicle acceleration request during vehicle running using only the motor torque Tm as the vehicle driving torque. According to the present embodiment, the torque rate control is to be executed at this kind of engine start-up. As a result, the torque rate at the time of engine start-up becomes different depending on the catalyst temperature at this engine start-up. Thus, the torque rate control is executed at the time of engine start-up with which the fuel increment control is executed, in order to make the torque rate variable. There is a following issue on the execution of the torque rate control at the time of engine start-up.

Figure 4:
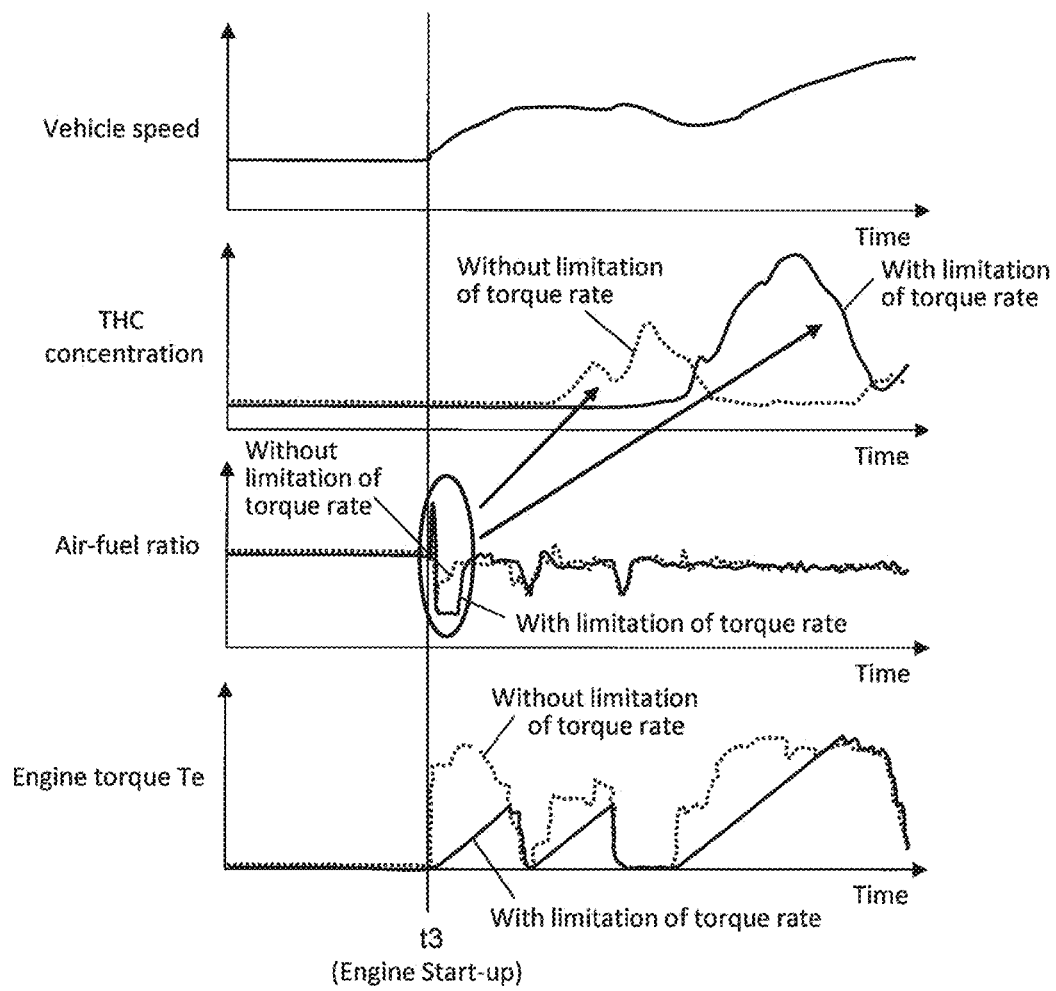
FIG. 4 is a time chart for describing an issue on execution of the torque rate control at the time of engine start-up.

FIG. 4 is a time chart for describing an issue on the execution of the torque rate control at the time of engine start-up. It should be noted that, from top to bottom in FIG. 4, a chart at the first stage indicates a time rate of change of the vehicle speed, and a chart at the second stage indicates a time rate of change of THC (Total Hydro Carbon) concentration (more specifically, THC concentration at a location downstream of the exhaust gas purifying catalyst 34) in the exhaust gas. In addition, a chart at the third stage indicates a time rate of change of the air-fuel ratio (more specifically, the value obtained by the use of an air-fuel ratio sensor (not shown) arranged in a portion of the exhaust gas passage 32 located on the upstream side of the exhaust gas purifying catalyst 34), and a chart at the fourth stage indicates a time rate of change of the engine torque Te.

A time point t3 in FIG. 4 corresponds to a time point at which, during vehicle running using only the motor torque Tm as the vehicle driving torque, the internal combustion engine 20 has been started up in response to a rapid acceleration request of the vehicle. Waveforms of the engine torque Te and the air-fuel ratio shown by broken lines in FIG. 4 are associated with an example in which the torque rate is not limited by the torque rate control. In this example, the internal combustion engine 20 is controlled so as to generate the engine torque Te depending on the accelerator position immediately after the start-up.

On the other hand, waveforms of the engine torque Te and the air-fuel ratio shown by solid lines in FIG. 4 are associated with an example in which there is a limitation of the torque rate by the torque rate control. In this example, the internal combustion engine 20 is controlled so as to generate the engine torque Te with the torque rate limited in accordance with the catalyst temperature. When the torque rate is low, the time rate of increase of throttle opening degree becomes low (i.e., the time rate of increase of the intake air amount becomes low). Because of this, during a time in which the engine torque Te is increasing, when the torque rate is lower, intake air negative pressure downstream of the throttle valve 30 becomes higher, and a time period in which this intake air negative pressure becomes higher becomes longer. When the intake air negative pressure becomes higher, the atomization of fuel attached on the intake air ports 26a is facilitated. The atomized fuel flows into the cylinders along with the intake air. Thus, when the torque rate is lower, the degree of enrichment of the air-fuel ratio may become greater.

FIG. 4 represents that the air-fuel ratio immediately after the engine start-up becomes different, due to the cause described above, depending on whether the torque rate control is performed or not (see portion surrounded by a circle). In detail, in the example with limitation of the torque rate (solid lines), the degree of enrichment of the air-fuel ratio immediately after the engine start-up becomes greater than that in the example without the limitation of the torque rate (broken lines). Also, in the example with the limitation of the torque rate, a time period of the enrichment also becomes longer than that in the example without the limitation of the torque rate. As a result, the way of increase of the THC concentration associated with the enrichment of the air-fuel ratio immediately after the engine start-up becomes different due to the differences of the magnitude and time period of the enrichment according to whether the torque rate control is performed or not. In detail, as shown with arrows in FIG. 4, in the example with the limitation of the torque rate (solid lines), the THC concentration (i.e., THC emission amount) becomes higher than the example without the limitation of the torque rate (broken lines).

1-2-4. Characteristics of Fuel Increment Control at Time of Engine Start-Up

In view of the issue described above, according to the present embodiment, the fuel increment control at the time of engine start-up is executed as follows. That is to say, the fuel increment controlling component 64 is configured, when a torque rate correlation value correlated with the torque rate is lower, to decrease a total fuel injection amount $Q_{TTL}$ during the above-described plurality of cycles (for example, ten cycles) that are subject to the fuel increment control. It should be noted that, according to the present embodiment, the torque rate itself is used as an example of the torque rate correlation value.

Figure 5:
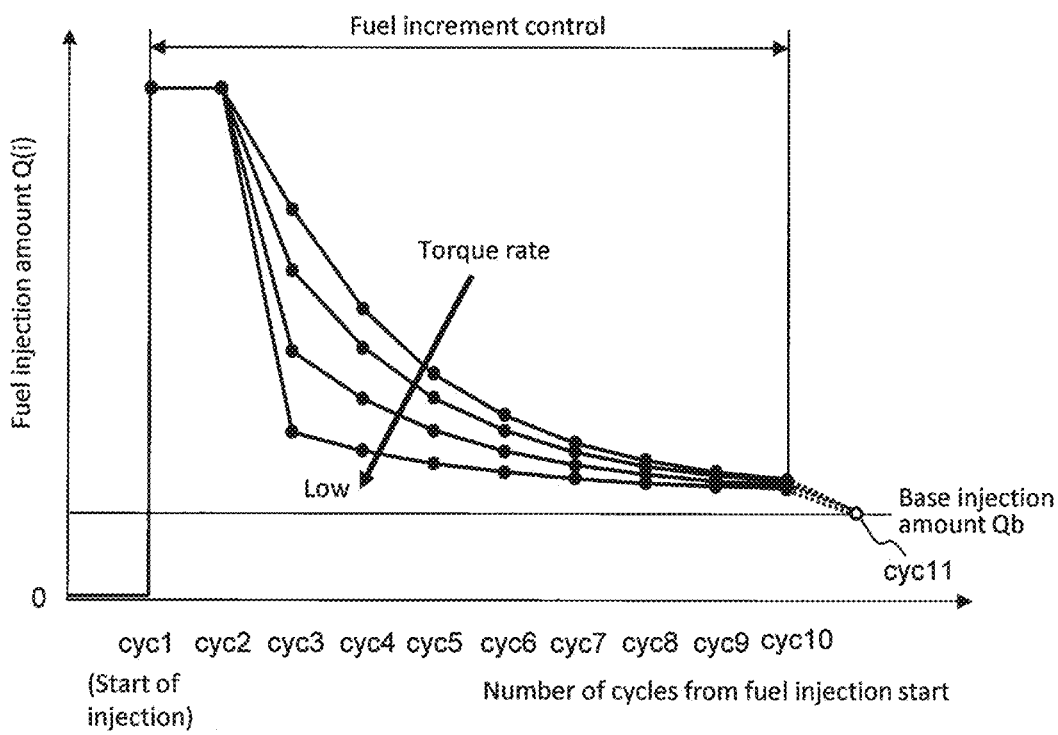
FIG. 5 is a graph for describing an example of the fuel increment control at the time of engine start-up according to the first embodiment of the present disclosure.

FIG. 5 is a graph for describing an example of the fuel increment control at the time of engine start-up according to the first embodiment of the present disclosure. In an example shown in FIG. 5, the fuel injection amounts Q(i) for the cycles cyc1 and cyc2 among the cycles (cyc1 to cyc10) subject to the fuel increment control are constant without depending on the magnitude of the torque rate. In addition, in this example, as shown in FIG. 5, each of the fuel injection amounts Q(i) of the cycles cyc3 to cyc10 is set so as to be less when the torque rate is lower. According to this kind of example of the setting, the total fuel injection amount $Q_{TTL}$, in the cycles subject to the fuel increment control can be decreased when the torque rate is lower.

Calculation of the fuel injection amounts Q(i) for the cycles cyc1 to cyc10 can be performed using the following manner, for example. That is to say, the fuel injection amounts Q(i) for the cycles cyc1 to cyc10 are shown by a product of the base injection amount Qb and a sum (1+K(i)) of 1 and an increment coefficient K(i), as shown in equation (1) described below. The increment coefficient K(i) corresponds to a value greater than 0. The sign i corresponds to the number that indicates a cycle subject to the fuel increment control.

$$Q(i)=Qb\times(1+K(i)) \quad (1)$$

Figure 6:
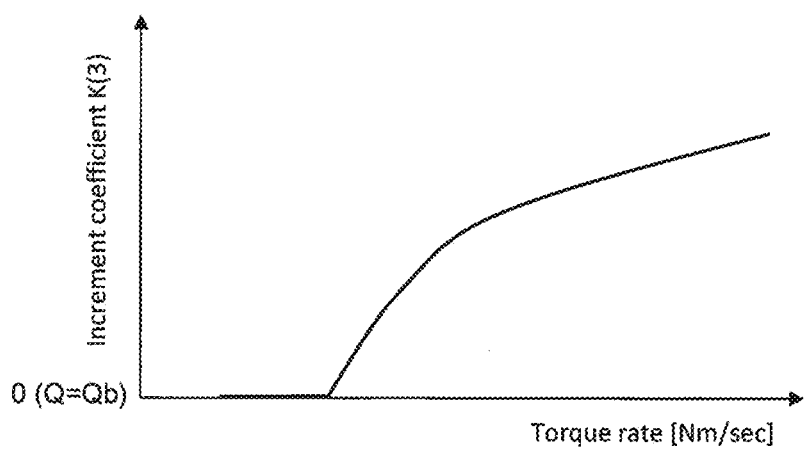
FIG. 6 is a graph that illustrates a relationship between an increment coefficient K(3) for the third cycle cyc3 and a torque rate.

Increment coefficients K(1) and K(2) for the cycles cyc1 and cyc2 are values adapted in advance, and are equal in magnitude, as an example. FIG. 6 is a graph that illustrates a relationship between an increment coefficient K(3) for the third cycle cyc3 and the torque rate. As shown in FIG. 6, the increment coefficient K(3) for the third cycle cyc3 is set so as to be smaller when the torque rate is lower. It should be noted that, as long as the increment coefficient K(3) is decreased when the torque rate is lower, the relationship between the increment coefficient K(3) and the torque rate is not limited to a curved line as shown in FIG. 6 and may be, for example, shown by a curved line having any other desired curvature or a straight line.

Increment coefficients K(4) to K(10) for the cycles cyc4 to cyc10 are shown by a product of the last value K(i−1) of the increment coefficient and an attenuation coefficient B, as shown in equation (2) described below. The attenuation coefficient B corresponds to a value greater than 0 and smaller than 1, and is a fixed value in the example shown in FIG. 5.

$$K(i)=K(i-1)\times B \quad (2)$$

Additionally, according to the example of the setting shown in FIG. 6, the minimum value of the increment coefficient K(3) is zero. As a result, according to the relationship of equation (2) described above, the increment coefficients K(4) to K(10) for the cycles cyc4 to cyc10 are all zero. Because of this, if the increment coefficient K(3) is made zero since the torque rate is low, the fuel increment is not performed in the cycles cyc3 to cyc10, and the fuel injection amounts Q(3) to Q(10) each become equal to the base injection amount Qb.

Figure 7:
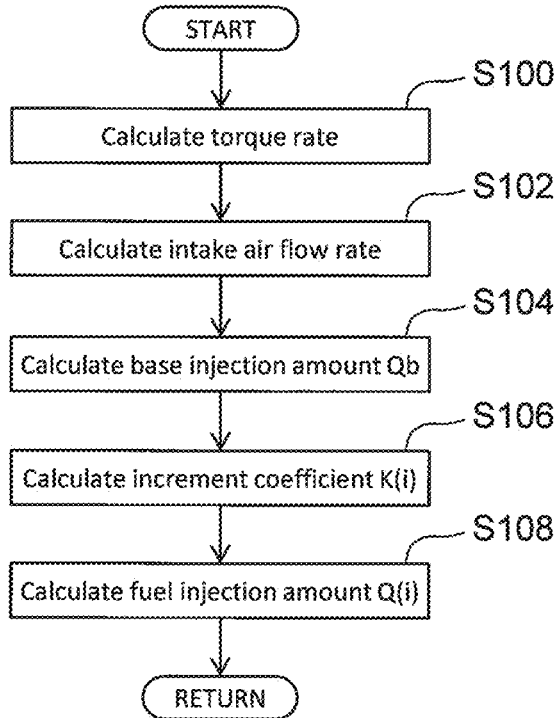
FIG. 7 is a flow chart that illustrates a routine of the processing concerning the fuel increment control at the time of engine start-up according to the first embodiment of the present disclosure.

1-2-5. Processing of Control Device Concerning Fuel Increment Control at Time of Engine Start-Up FIG. 7 is a flow chart that illustrates a routine of the processing concerning the fuel increment control at the time of engine start-up according to the first embodiment of the present disclosure. During vehicle running in which only the motor torque Tm is used as the vehicle driving torque, the control device 60 determines whether or not there is an engine torque request associated with an engine start-up request. This determination can be performed on the basis of, for example, the required vehicle driving torque calculated in accordance with the accelerator position detected by the accelerator position sensor 62. The present routine is started when it is determined that there is an engine torque request associated with an engine start-up request. The processing according to the present routine is repeatedly executed to determine the fuel injection amounts Q(i) for the cycles (cyc1 to cyc10) subject to the fuel increment control.

According to the routine shown in FIG. 7, first, the control device 60 calculates the torque rate in step S100. As already described with reference to FIG. 3, the torque rate is calculated as a value depending on the catalyst temperature as an example. It should be noted that the control device 60 uses the processing of a routine (not shown) to execute the above-described torque rate control. As a result, the engine torque Te and the motor torque Tm are controlled so as to be in accordance with the latest torque rate.

Then, the control device 60 calculates the intake air amount (i.e., in-cylinder charge air amount) in step S102. This intake air amount can be calculated by, for example, inputting, to a known mathematical model for the intake system, designated parameters including the intake air flow rate detected by the air flow sensor 28 and the engine speed NE calculated by the use of the crank angle sensor 38.

Then, in step S104, the control device 60 calculates the base injection amount Qb. The base injection amount Qb can be calculated by dividing the intake air amount calculated in step S102 by the stoichiometric air-fuel ratio.

Then, in step S106, the control device 60 calculates the increment coefficient K(i) associated with the current cycle CYC(i). As already described, the increment coefficients K(1) and K(2) for the cycles cyc1 and cyc2 are adapted in advance. The control device 60 stores a map (not shown) that defines a relationship between the increment coefficient K(3) for the third cycle cyc3 and the torque rate as shown in FIG. 6. The increment coefficient K(3) is calculated as a value depending on the torque rate with reference to this kind of map. The increment coefficients K(4) to K(10) for the cycles cyc4 to cyc10 are calculated in accordance with the relationship of equation (2) described above, by the use of a designated attenuation coefficient B.

Then, in step S108, the control device 60 calculates the fuel injection amount Q(i) associated with the current cycle CYC(i). The fuel injection amount Q(i) is calculated in accordance with the relationship of equation (1) described above, by the use of the base injection amount Qb and the increment coefficient K(i).

1-3. Advantageous Effects

As described so far, according to the fuel increment control at the time of engine start-up in the present embodiment, the total fuel injection amount $Q_{TTL}$ during the cycles subject to the fuel increment control becomes less when the torque rate is lower. As a result, the enrichment of the air-fuel ratio due to the fact that the fuel increment is executed under low torque rates at the time of engine start-up is reduced. Because of this, when the engine start-up is executed under the low torque rates, a decrease of the exhaust gas emission performance (more specifically, an increase of the THC emission amount) can be reduced. In more detail, according to the example shown in FIGS. 5 and 6, since the fuel injection amounts Q(i) for the cycles cyc3 to cyc10 are decreased in accordance with a decrease of the torque rate, the degree of the enrichment of the air-fuel ratio (i.e., the depth of the enrichment) can be reduced to a low level.

Moreover, the present embodiment corresponds to an example in which the torque rate is actively limited by the torque rate control at the time of engine start-up. Because of this, according to the fuel increment control described above, it can also be said that the torque rate control can be performed at the time of engine start-up while reducing increase of the THC emission amount due to the above-described enrichment of the air fuel ratio. In addition, according to the example of the torque rate control that uses the torque rate depending on the catalyst temperature, the reduction of decrease of the exhaust gas emission performance based on the reduction of fluctuation of the air-fuel ratio and increase of the exhaust gas flow rate, which is an original purpose of this torque rate control, can be achieved while reducing increase of the THC emission amount due to the enrichment of the air-fuel ratio.

Figure 8:
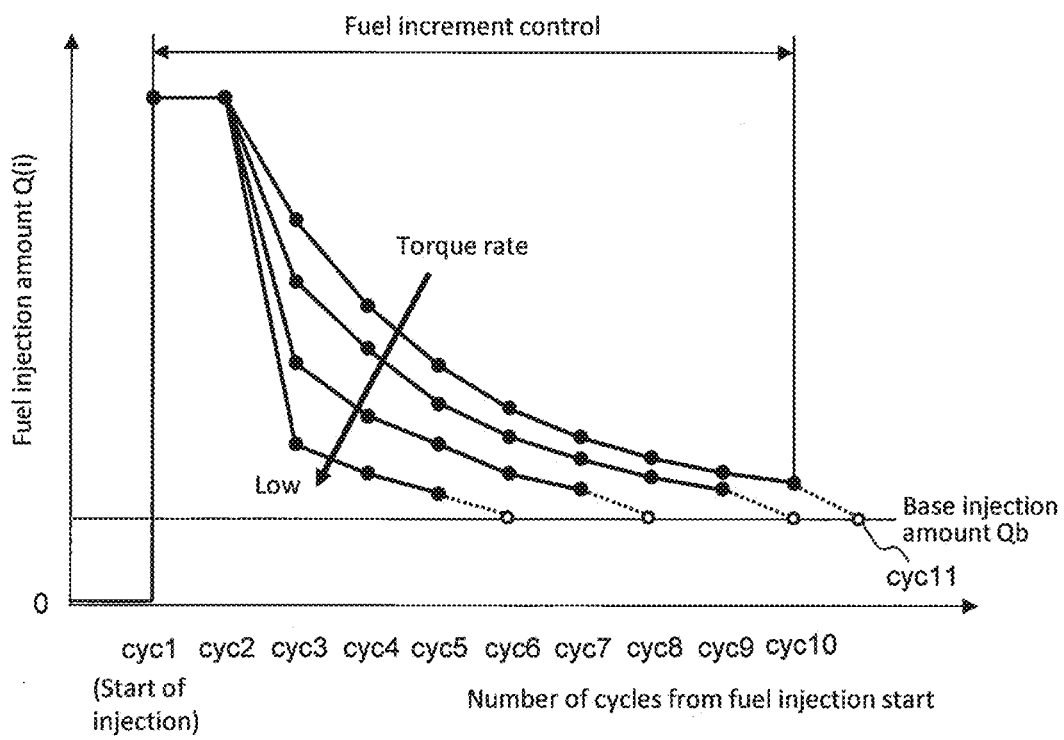
FIG. 8 is a graph for describing a first modification example of the manner of decrement correction of a total fuel injection amount $Q_{TTL}$ according to the first embodiment of the present disclosure.

1-4. Modification Examples of Manner of Decrement Correction of Total Fuel Injection Amount $Q_{TTL}$ FIG. 8 is a graph for describing a first modification example of the manner of decrement correction of the total fuel injection amount $Q_{TTL}$ according to the first embodiment of the present disclosure. In the first embodiment described above, in order to perform the decrement correction of the total fuel injection amount $Q_{TTL}$, as shown in FIG. 5, each of the fuel injection amounts Q(i) for the cycles cyc3 to cyc10 is decreased when the torque rate is lower. In contrast to this, according to this first modification example, as shown in FIG. 8, each of the fuel injection amounts Q(i) for cycles CYC(i) subject to the fuel increment control that are the third cycle cyc3 or later is decreased when the torque rate is lower, and the number of cycles subject to the fuel increment control is also decreased when the torque rate is lower. According to the decrement correction of the total fuel injection amount $Q_{TTL}$ according to this kind of first modification example, the time period of the enrichment of the air-fuel ratio can be shortened in addition to the reduction of the degree of the enrichment of the air-fuel ratio (i.e., the depth of the enrichment). The control device 60 uses, for example, a map that defines a relationship as shown in FIG. 8, that is, a relationship of the fuel injection amount Q(i) with respect to the torque rate and the number of cycles, and can thus perform the decrement correction of the total fuel injection amount $Q_{TTL}$ according to the first modification example.

Figure 9:
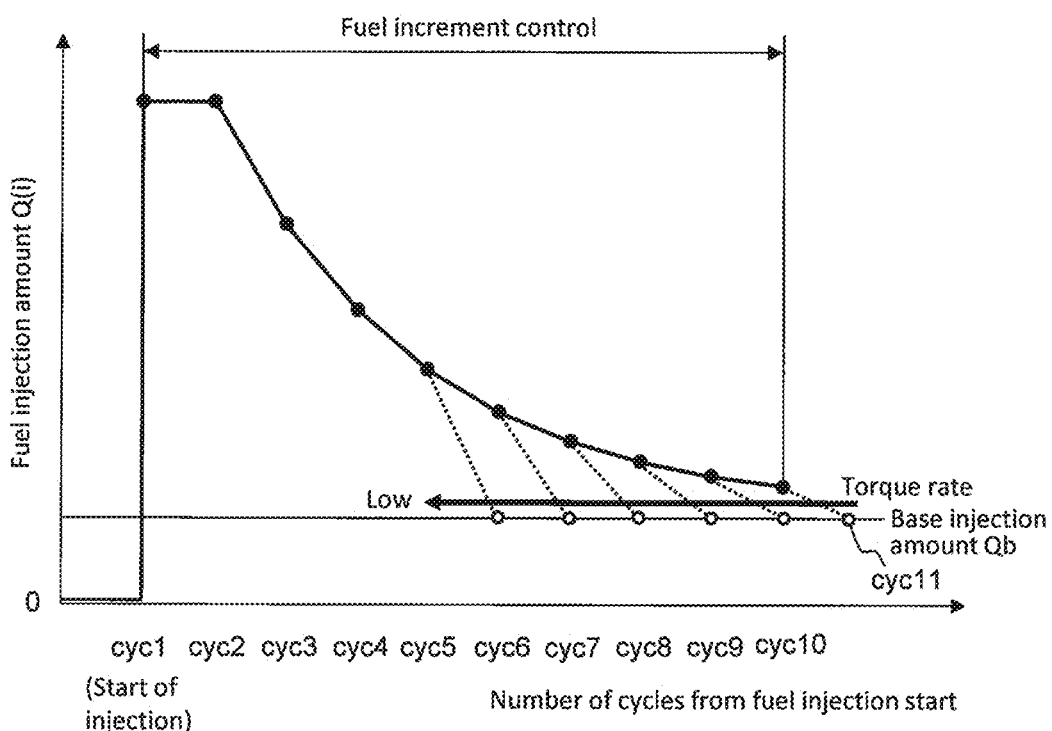
FIG. 9 is a graph for describing a second modification example of the manner of decrement correction of the total fuel injection amount $Q_{TTL}$ according to the first embodiment of the present disclosure.

FIG. 9 is a graph for describing a second modification example of the manner of decrement correction of the total fuel injection amount $Q_{TTL}$, according to the first embodiment of the present disclosure. According to this second modification example, as shown in FIG. 9, although the fuel injection amounts Q(i) for the cycles CYC(i) subject to the fuel increment control that are the third cycle cyc3 or later are not changed in accordance with the torque rate, the number of cycles subject to the fuel increment control is decreased when the torque rate is lower. According to the decrement correction of the total fuel injection amount $Q_{TTL}$, based on this kind of the second modification example, the time period of the enrichment of the air-fuel ratio can be shortened. Similarly to the first modification example, the control device 60 uses, for example, a map that defines a relationship as shown in FIG. 9, and can thus perform the decrement correction of the total fuel injection amount $Q_{TTL}$, according to the second modification example.

Furthermore, according to the examples respectively shown in FIGS. 5 and 8 described above, each of the fuel injection amounts Q(i) for the cycles cyc3 to cyc10 are set so as to be less when the torque rate is lower. However, one or more cycles in which the fuel injection amount per one cycle is decreased when the torque rate (i.e., torque rate correlation value) is lower may be other than the examples described above, and be one or more desired cycles among the cycles cyc1 to cyc10.

2. Second Embodiment

Then, a second embodiment according to the present disclosure and modification examples thereof will be described with reference to FIGS. 10 to 12. In the following explanation, it is supposed that the configuration shown in FIG. 1 is used as an example of the hardware configuration of the vehicle system according to the second embodiment.

2-1. Characteristics of Fuel Increment Control at Time of Engine Start-Up

According to the fuel increment control of the first embodiment described above, the decrement correction of the total fuel injection amount $Q_{TTL}$ based on the torque rate is executed within a range that is not lower than the base injection amount Qb. In contrast to this, according to the fuel increment control of the present embodiment, when the torque rate is extremely low, the fuel injection amount Q(i) is corrected so as to be less than the base injection amount Qb.

Figure 10:
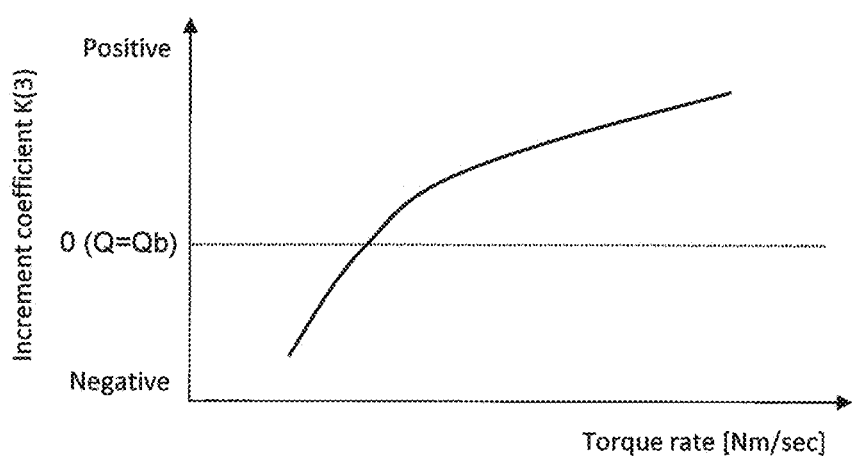
FIG. 10 is a graph that illustrates a relationship between the increment coefficient K(3) for the third cycle cyc3 and the torque rate that are used in a second embodiment of the present disclosure.

FIG. 10 is a graph that illustrates a relationship between the increment coefficient K(3) for the third cycle cyc3 and the torque rate that are used in the second embodiment of the present disclosure. As shown in FIG. 10, according to the present embodiment, when the torque rate is extremely low, the increment coefficient K(3) may take a negative value. That is to say, according to the present embodiment, the increment coefficient K(3) is set so as to be less when the torque rate is lower, including a negative range of the increment coefficient K(3).

Figure 11:
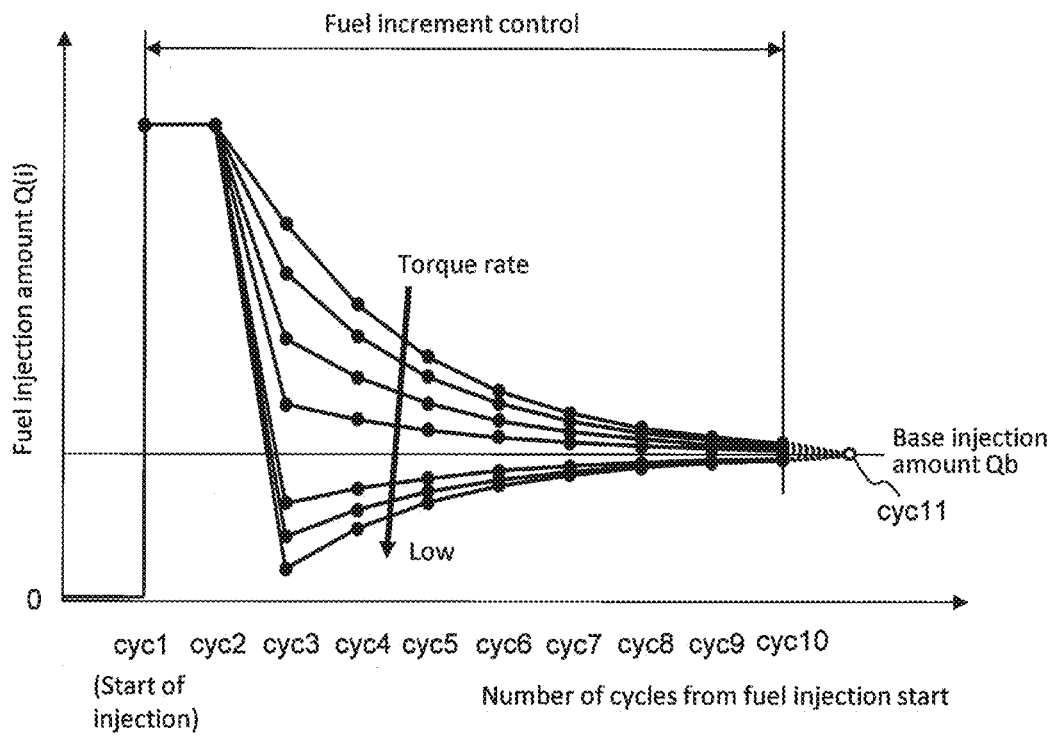
FIG. 11 is a graph for describing an example of a fuel increment control at the time of engine start-up according to the second embodiment of the present disclosure.

FIG. 11 is a graph for describing an example of the fuel increment control at the time of engine start-up according to the second embodiment of the present disclosure. The calculation manner of the fuel injection amounts Q(i) for the respective cycles CYC(i) in the example shown in FIG. 11 is the same as that in the example shown in FIG. 5, except that the example of the setting of the increment coefficient K(3) shown in FIG. 10 is used instead of the example of the setting of the increment coefficient K(3) shown in FIG. 6.

According to the example shown in FIG. 11, when the increment coefficient K(3) takes a negative value, the fuel injection amount Q(3) for the third cycle cyc3 becomes less than the base injection amount Qb, and the fuel injection amount Q(3) becomes less when the torque rate is lower. Moreover, according to this example, in the cycles CYC(i) that are the fourth cycle cyc4 or later, the fuel injection amounts Q(i) gradually approaches the base injection amount Qb with the progression of cycles. According to this kind of manner of the decrement correction of the total fuel injection amount $Q_{TTL}$, the total fuel injection amount $Q_{TTL}$, can be decreased when the torque rate is lower, including a torque rate range in which the increment coefficient K(3) is negative. In addition, by the use of this kind of manner of the decrement correction, the processing by the fuel increment controlling component 64 to decrease the fuel injection amount per one cycle in the cycles cyc3 to cyc10 includes a lean correction that makes the air-fuel ratio (more specifically, in-cylinder air-fuel ratio) leaner than the stoichiometric air-fuel ratio.

The fuel increment control according to the present embodiment described above can be achieved using a routine similar to the above-described routine shown in FIG. 7 with a map (not shown) that defines a relationship between the increment coefficient K(3) for the third cycle cyc3 as shown in FIG. 10 and the torque rate and that is stored in the control device 60.

2-2. Advantageous Effects

As described so far, according to the fuel increment control of the present embodiment, when the torque rate is extremely low, correction to make the fuel injection amount less than the base injection amount Qb (i.e., the lean correction to obtain the air-fuel ratio leaner than the stoichiometric air-fuel ratio) is executed. As a result, even when the air-fuel ratio may be greatly made rich since the torque rate is extremely low, the total fuel injection can be properly reduced.

2-3. Modification Examples of Manner of Decrement Correction of Total Fuel Injection Amount $Q_{TTL}$ FIG. 12 is a graph for describing a modification example of the manner of decrement correction of the total fuel injection amount $Q_{TTL}$ according to the second embodiment of the present disclosure. In this modification example, similarly to the example shown in FIG. 11 described above, each of the fuel injection amounts Q(i) for the cycles CYC(i) that are the third cycle cyc3 or later is decreased when the torque rate is lower, including a torque rate range in which the increment coefficient K(3) is negative.

Moreover, according to this modification example, in a torque rate range in which correction to make the fuel injection amount greater than the base injection amount Qb (i.e., a rich correction to obtain an air-fuel ratio richer than the stoichiometric air-fuel ratio) is performed (in order words, where the fuel injection amount per one cycle is controlled, within a range in which the air-fuel ratio (in-cylinder air-fuel ratio) is made richer than the stoichiometric air-fuel ratio, to decrease the total fuel injection amount $Q_{TTL}$), the number of cycles subject to the rich correction (i.e., fuel increment) is decreased when the torque rate is lower (similarly to the first modification example shown in FIG. 8).

Figure 12:
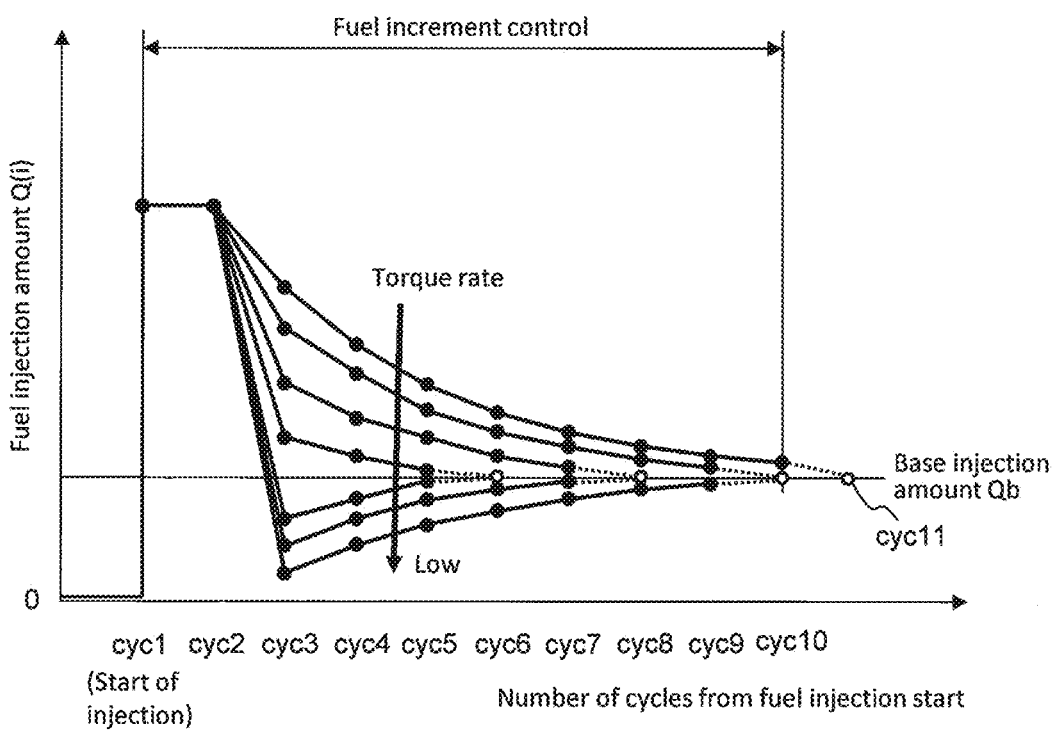
FIG. 12 is a graph for describing a modification example of the manner of decrement correction of the total fuel injection amount $Q_{TTL}$ according to the second embodiment of the present disclosure.

On the other hand, in a torque rate range in which the lean correction is performed (in order words, where the fuel injection amount per one cycle is controlled, within a range in which the air-fuel ratio (in-cylinder air-fuel ratio) is made leaner than the stoichiometric air-fuel ratio, to decrease the total fuel injection amount $Q_{TTL}$), the number of cycles subject to the lean correction (i.e., fuel decrement) is increased when the torque rate is lower as shown in FIG. 12.

The control device 60 uses, for example, a map that defines the relationship as shown in FIG. 12, that is, the relationship of the fuel injection amount Q(i) with respect to the torque rate and the number of cycles, and, as a result, can perform the decrement correction of the total fuel injection amount $Q_{TTL}$ according to this modification example.

Furthermore, although illustration is herein omitted, in the torque rate range in which the lean correction is performed, the fuel injection amounts Q(i) for the cycles CYC(i) in which the lean correction (i.e., fuel decrement) is performed may not be changed in accordance with the torque rate, and only the number of cycles in which the lean correction is performed may alternatively be increased when the torque rate is lower.

3. Other Embodiments 3-1. Examples of Other Hybrid Types

According to the first and second embodiments described above, the power-split hybrid vehicle that can freely combine or divide the torques from the internal combustion engine 20, the first motor generator 40 and the second motor generator 42 is taken as an example. However, hybrid types that can be applied to the vehicle system according to the present disclosure is not limited to the power split type. That is to say, another hybrid type may be, for example, a so-called parallel type that uses both of an internal combustion engine and a motor generator for driving the vehicle wheels. In addition, still another hybrid type may be, for example, a so-called series type that uses an internal combustion engine only for performing a power generation, and that uses a motor generator for driving the vehicle wheels and performing a regenerative power generation.

3-2. Example Without Torque Rate Control

Application of the vehicle system according to the present disclosure is not limited to the hybrid vehicles. That is to say, the vehicle system according to the present disclosure may alternatively be applied to a vehicle on which only an internal combustion engine is mounted as its power device for driving the vehicle wheels. Also, in an example of the application into this vehicle, the decrement correction of the total fuel injection amount $Q_{TTL}$, based on the torque rate may be executed without the torque rate control. More specifically, the "torque rate correlation value" used in this example may not always be the torque rate itself that is set by the torque rate control as described in the first and second embodiments. In detail, the torque rate correlation value in this example may be, for example, the time rate of change of the depression amount of the accelerator pedal at the time of the engine start-up, the time rate of increase of the throttle opening degree, the time rate of increase of the intake air amount, or a time rate of increase of intake air pressure downstream of a throttle valve.

For example, if a system of a vehicle on which only an internal combustion engine is mounted as its power device is configured such that an S&S (Stop & Start) control can be performed, an engine torque request accompanied by an engine start-up request may be issued when an accelerator pedal is depressed during engine stop by the S&S control. In addition, the engine torque Te required at the time of engine start-up becomes different in accordance with the way of depression of the accelerator pedal in response to this engine torque request. Because of this, during execution of the fuel increment control after the engine start-up, a fuel increment controlling component in a vehicle system may, for example, calculate the time rate of increase described above (such as, the above-described time rate of increase of the accelerator position) as a torque rate correlation value, and may decrease the total fuel injection amount $Q_{TTL}$ for a plurality of cycles when the calculated torque rate correlation value is lower.

The embodiments and modification examples described above may be combined in other ways than those explicitly described above as required and may be modified in various ways without departing from the scope of the present disclosure.

What is claimed is:

1. A vehicle system, comprising:
an internal combustion engine including a fuel injection valve configured to inject fuel into an intake port and a throttle valve configured to control intake air amount for controlling engine torque, and being mounted on a vehicle; and
a control device configured to control the vehicle,
wherein the control device includes a fuel increment controlling component that executes a fuel increment control to make an air-fuel ratio richer than a stoichiometric air-fuel ratio in a plurality of engine cycles started from a fuel injection start cycle at a time of engine start-up, and
wherein, where a torque rate correlation value correlated with a torque rate, that is a time rate of increase of the engine torque, decreases, the fuel increment controlling component decreases a total fuel injection amount in each of the plurality of engine cycles,
wherein, in the fuel increment control, the fuel increment controlling component causes a number of the plurality of engine cycles to decrease as the torque rate correlation value decreases.

2. The vehicle system according to claim 1,
wherein the vehicle system is a hybrid vehicle system including an electric motor configured to drive the vehicle,
wherein the control device includes a torque rate controlling component that executes a torque rate control for varying the torque rate at the time of engine start-up, and
wherein the torque rate correlation value corresponds to the torque rate that is set by the torque rate controlling component.

3. The vehicle system according to claim 1,
wherein, where the torque rate correlation value decreases, the fuel increment controlling component decreases a fuel injection amount per one engine cycle in at least one of the plurality engine cycles.

4. The vehicle system according to claim 3,
wherein a processing executed by the fuel increment controlling component to decrease the fuel injection amount per one engine cycle in at least one of the plurality of engine cycles makes the air-fuel ratio leaner than the stoichiometric air-fuel ratio.

5. The vehicle system according to claim 1, wherein, when the air-fuel ratio is made leaner than the stoichiometric air-fuel ratio, in
the fuel increment control, the fuel increment controlling component causes a number of the plurality of engine cycles to increase as the torque rate correlation value decreases.

6. A vehicle system, comprising:
an internal combustion engine, wherein the internal combustion engine comprises:
a fuel injection valve configured to inject fuel into an intake port, and a throttle valve configured to control intake air amount for controlling engine torque; and
a control device configured to:
control the fuel injection valve to have an air-fuel ratio richer than a stoichiometric air-fuel ratio during a plurality of engine cycles, wherein the plurality of engine cycles begins at a time of engine start-up, and
when the air-fuel ratio is made leaner than the stoichiometric air-fuel ratio, increase a number of the plurality of engine cycles as a torque rate correlation value decreases.

7. The vehicle system according to claim 6, further comprising an accelerator, wherein the control device is configured to determine the total requested torque based on a position of the accelerator.

8. The vehicle system according to claim 6, wherein the control device is configured to maintain the total fuel amount injected per engine cycle for a first number of engine cycles of the plurality of engine cycles, and to decrease the total fuel amount injected for each engine cycle of the plurality of engine cycles following the first number of engine cycles.

9. The vehicle system according to claim 8, wherein the first number of engine cycles is two engine cycles.

10. A vehicle system, comprising:
an internal combustion engine, wherein the internal combustion engine comprises:
a fuel injection valve configured to inject fuel into an intake port, and
a throttle valve configured to control intake air amount for controlling engine torque; and
a control device configured to:
control the fuel injection valve to have an air-fuel ratio richer than a stoichiometric air-fuel ratio during a plurality of engine cycles, wherein the plurality of engine cycles begins at a time of engine start-up, and a number of the plurality of engine cycles is determined based on a torque rate correlation value,
decreasing a total fuel amount injected per engine cycle of the plurality of engine cycles, wherein the air-fuel ratio remains greater than the stoichiometric air-fuel ratio during the plurality of engine cycles.

11. The vehicle system according to claim 10, wherein the control device is configured to change the number of the plurality of engine cycles as the torque rate correlation value changes.

12. The vehicle system according to claim 10, wherein the control device is configured to increase the number of the plurality of engine cycles as the torque rate correlation value decreases.

13. The vehicle system according to claim 10, wherein the control device is configured to decrease the number of the plurality of engine cycles as the torque rate correlation value decreases.

14. The vehicle system according to claim 10, wherein a total requested torque remains constant during the plurality of engine cycles.

* * * * *